United States Patent [19]

Brown

[11] 4,337,541
[45] Jul. 6, 1982

[54] POLLEN TRAP FOR BEEHIVES
[76] Inventor: Royden Brown, 4343 E. Keim Dr., Phoenix, Ariz. 85253
[21] Appl. No.: 223,935
[22] Filed: Jan. 9, 1981
[51] Int. Cl.³ .............................................. A01K 47/06
[52] U.S. Cl. ........................................................ 6/4 R
[58] Field of Search .................... 6/1, 2 R, 4 R, 12 M, 6/12 R

[56] References Cited
U.S. PATENT DOCUMENTS

| 2,566,829 | 9/1951 | France .................................. | 6/12 R |
| 3,343,186 | 9/1967 | Dunand ..................................... | 6/1 |
| 3,995,338 | 12/1976 | Kauffeld ................................. | 6/4 R |
| 4,007,504 | 2/1977 | West ....................................... | 6/4 R |

FOREIGN PATENT DOCUMENTS

| 1223455 | 1/1959 | France .................................. | 6/12 M |
| 2000008 | 1/1979 | United Kingdom ....................... | 6/1 |

OTHER PUBLICATIONS

The Andes Pollen Trap by Manuel R. Chepote Malatesta, published Jan. 1979 in the American Bee Journal, pp. 21 and 25.

Primary Examiner—Gene Mancene
Assistant Examiner—Robert P. Swiatek
Attorney, Agent, or Firm—Warren F. B. Lindsley

[57] ABSTRACT

A pollen trap for use on honey bee colonies in which a pollen collecting drawer may be removable from any side of the hive; provides a cluster space for the worker bees in the pollen trap; forms with the bottom board a hive entranceway for the worker bees; and also can be effectively positioned at the middle or top of the hive and can be used in double queen colonies as queen excluders.

6 Claims, 18 Drawing Figures

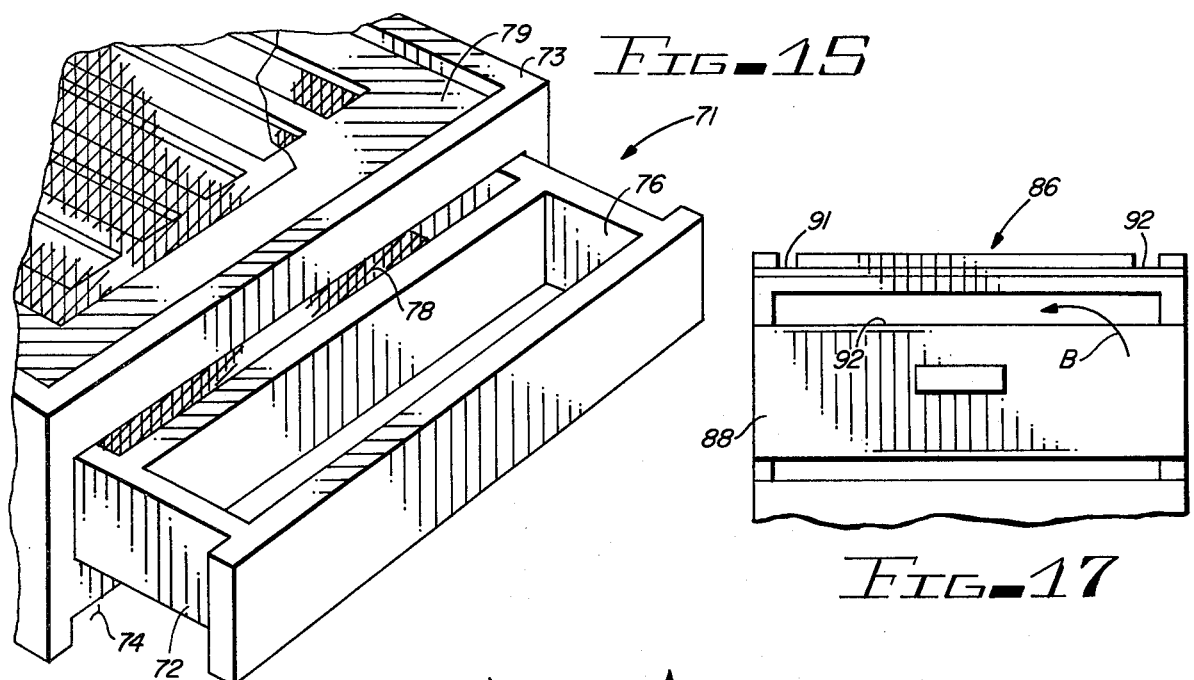
Fig-15
Fig-17
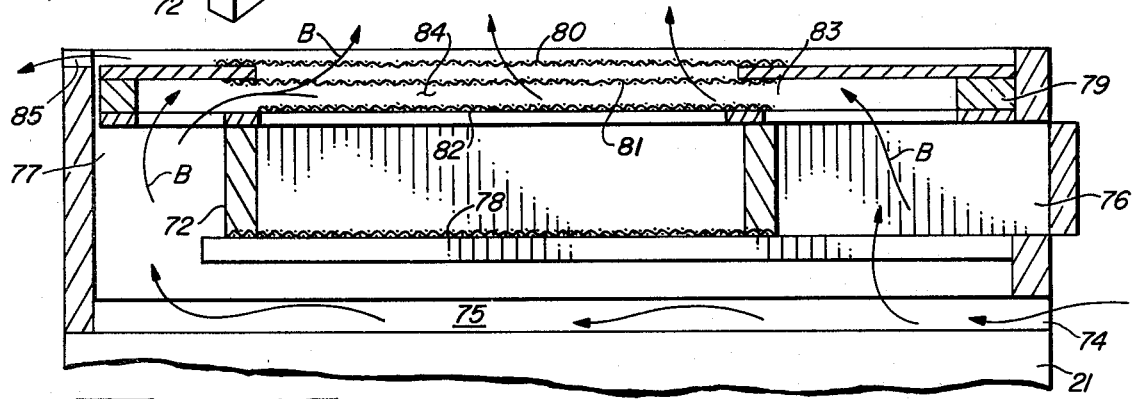
Fig-16
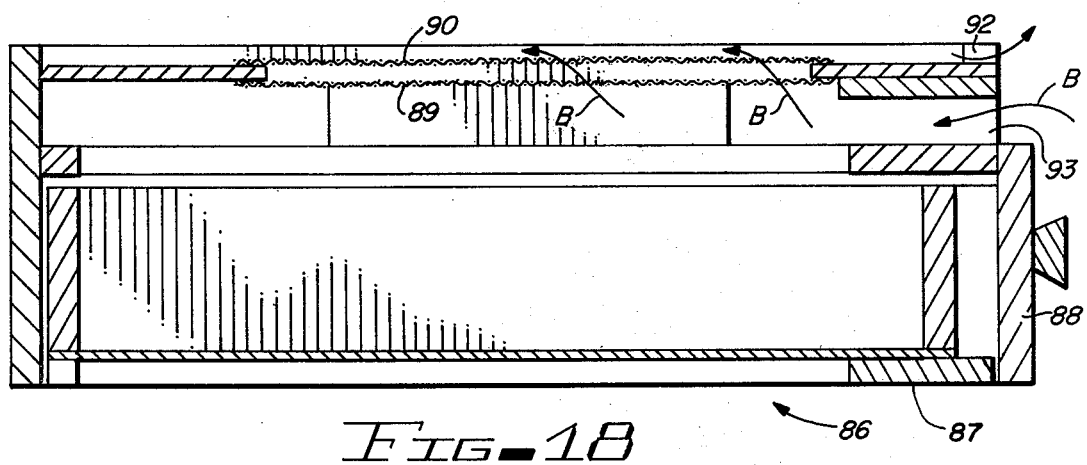
Fig-18

POLLEN TRAP FOR BEEHIVES

BACKGROUND OF THE INVENTION

Floral pollen is the male seed (sperm) of flowers which brings about the fertilization of the plant. This pollen consists of tiny corpuscles, 50/1000ths of a millimeter and is produced in so-called "anthers" which form the upper part of the "stamens" of a plant. These stamens, which vary in number according to the specie of plant, grow up from the base of the flower as delicate filaments, which are broadened into small pads at their free ends. In these pads the pollen is formed and from these anthers the foraging bees collect their pollen.

The worker bees who collect pollen mold it into a solid mass with a little honey and then attach the resulting kernel to the outer part of their hind legs.

When a pollen collecting worker bee returns to its hive it stores the pollen in a separate group of cells from the honey inside the honeycombs, to be taken out again when needed.

Since pollen is considered by many the perfect food and by others a diet supplement it is collected from honey bees by means of pollen traps which are attached to their hives. In many of the prior art uses a grid is placed over the hive entrance so that the bees have to push through it to get into the hive. In doing so the pollen pellets are dislodged from their legs and fall into a trough.

DESCRIPTION OF THE PRIOR ART

Although pollen traps have been placed over the hive entranceways to collect pollen most of the devices consisted of a single piece of hardware cloth or a piece thereof folded back on itself. If a trash grid is not used, the pollen is contaminated with large amounts of trash including dead bees accumulated in a pile between the hive entrance and the pollen trap.

Prior art pollen traps that are attached to the entranceways to the hives agitate the bees when the traps are removed and interrupt the flight of the bees into the hives causing them to gather in front of the hive often in clusters.

U.S. Pat. No. 3,995,338 discloses a pollen trap with a cleaning grid mounted on a known beehive. This pollen trap requires the bees to enter the hive through an unfamiliar entranceway. In addition to an unfamiliar entranceway, the bees have to twist their bodies through a double screen grid with offset squares to loosen the pollen pellets from their feet. Further, this pollen trap has no facilities for the worker bees to cluster in the hive in a warm protected area.

U.S. Pat. No. 4,007,504 discloses a single grid or screen across the entryway of a hive for controlling the movement of bees into the hive. The screen is intended to loosen pollen on the legs of the bees as they pass therethrough. A container is located below the grid or screen for receiving the pollen falling off of the bees passing therethrough.

French Pat. No. 1,223,455 discloses a drawer employing a grid mounted at a point spaced from the entranceway of the hive and serving as a pollen trap.

Manuel R. Chepote Malatesta in his article published January 1979 in the *American Bee Journal* entitled "The Andes Pollen Trap" discloses the benefits of a double layer wire mesh for removing pollen from the legs of the bees. There is no teaching of mounting this in an easily removable drawer which keeps the pollen from piling up at the entranceway of the hive.

SUMMARY OF THE INVENTION

In accordance with the invention claimed, a new and improved pollen trap is provided which, forming an entranceway to the hive, effectively removes a desired amount of the pollen from the legs of the bees by means of a trap that may be mounted at the bottom, middle or top of the hive.

It is, therefore, one object of this invention to provide a new and improved pollen trap.

Another object of this invention is to provide a new and improved pollen trap for beehives forming the familiar entranceway to the hive which eliminates rodents, ants and other creatures from entering the colony.

A further object of this invention is to provide a new and improved pollen trap employing a drawer, the sides and partitions of which the bees use as a ladder to crawl through a grid forming a part of the pollen trap.

A still further object of this invention is to provide a new and improved pollen trap which fits substantially all existing beehives.

A still further object of this invention is to provide an improved pollen trap for beehives which may be mounted on the hive so that its pollen drawer may be removed from any side of the colony.

A still further object of this invention is to provide an improved pollen trap with openings of sufficient size in the front of or in the rear of the drawer of the trap to provide cluster spaces for the bees outside of the colony but inside of the hive away from cold air, drafts, winds and enemy predators.

A still further object of this invention is to provide an improved pollen trap for beehives that provides a cluster space of such a size and configuration that it discourages the worker bees from building burcombs therein.

A still further object of this invention is to provide an improved pollen trap employing a familiar bee entranceway which is divided into more than one part, the sectional dividers of which provide ladders for the bees to climb through pollen removing grates or screens.

A still further object of this invention is to provide a pollen trap within which the wire mesh on the bottom of the pollen drawer may be varied to meet the needs for storing the pollen under various atmospheric conditions surrounding the colony.

A still further object of this invention is to provide a pollen trap employing optimum mesh size for the various staggered grates used therein.

A still further object of this invention is to provide a new and improved drawer for a pollen trap that supports and houses the replaceable grids that trap the pollen from the legs of the bees.

A still further object of this invention is to provide a new and improved pollen trap, the drawer of which may be removed to eliminate the pollen trapping capabilities of the trap thereby permitting free ingress and egress from the hive without affecting the normal function of the hive.

A still further object of this invention is to provide a new and improved pollen trap for a beehive employing a separate entranceway for drones.

A still further object of this invention is to provide a simple, easily constructed pollen trap that can be readily duplicated and formed if desired out of unused supers of the beehive.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 15 is a partial exploded perspective view of another modification of the pollen trap shown in 9 and 13;

FIG. 16 is a cross-sectional view of the pollen trap shown in FIG. 15 illustrating the path of movement of the bees;

FIG. 17 is a front view of a further modification of the pollen trap shown in FIGS. 13 and 15; and FIG. 18 is a cross-sectional view of the pollen trap shown in FIG. 17.

DESCRIPTION OF THE PREFERRED EMBODIMENT

Figure 1:
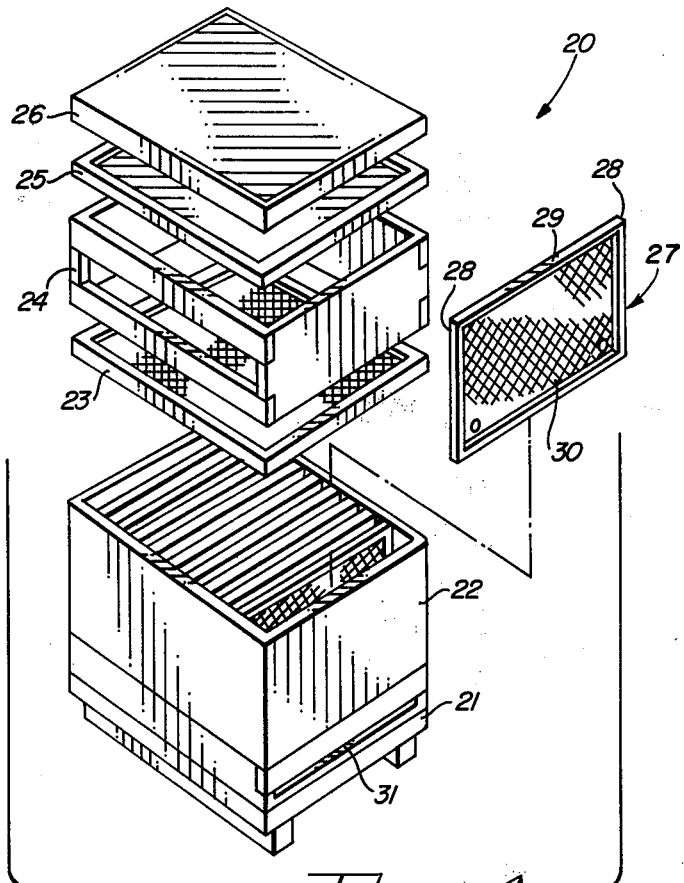
FIG. 1 is a perspective exploded view of a modern beehive.

Referring more particularly to the drawings by characters of reference, FIG. 1 discloses a modern beehive 20 comprising a pallet supported bottom board 21, a brood nest or box 22, a queen excluder 23 comprising a grate mesh formed of wire 0.163 to 0.167 inches apart, one or more honey storage supers 24, an inner cover 25 and a cover or roof 26.

The queen excluder 23 is an important piece of equipment for some beekeepers since it has spaces wide enough so that worker bees may pass through but the queen and drone bees cannot. If the queen excluder is placed above the brood nest, the queen is confined in that area and cannot lay eggs in the honey storage area of the supers.

The brood nest 22 and super 24 comprising an open ended rectangular shell contain a plurality of hanging combs or frames 27. Although ten frames are shown in the brood nest 22 in FIG. 1, many beekeepers use nine frames in the standard hive. The slightly wider spacing makes it easier to remove the combs and to inspect the brood nest.

In the super 24 (and honey storage area), beekeepers use nine frames evenly spaced. By using nine frames in a ten frame beehive, the bees, due to the wider spacing in the super than in the brood nest, draw out the cells making them deeper, thereby easier to uncap by the beekeeper.

There are also eight to twelve frame beehives with smaller or larger brood boxes, respectively. The disclosed pollen traps are built smaller or larger to fit these often called non-standard hives.

Each hanging frame 27 is rectangular in form and designed to leave a bee space all around. Lugs 28 are formed as extensions of the top bar 29 so that the frames can be hung from rebates in the side walls of the brood nest and super or from the built out portions of these parts of the hive. Sheets of wax foundation 30 complete the well known frame construction.

An entranceway 31 into the beehive is generally formed between the bottom board 21 and the bottom of the brooder box 22 as shown in FIG. 1.

In accordance with the invention claimed, a new and improved pollen trap 32 is added to the modern beehive 20 in such a manner that the young bees in the hive are not stressed and the flight of bees coming into or leaving the hive are not unduly obstructed.

Figure 2:
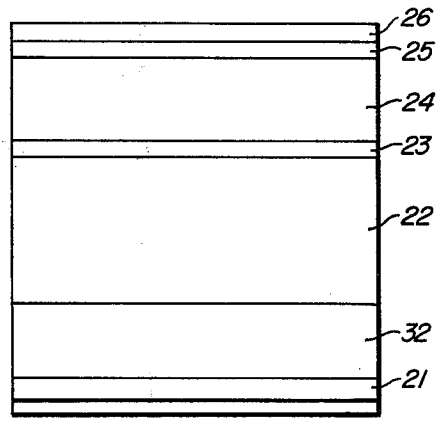
FIG. 2 is a side view of a modification of the beehive shown in FIG. 1 employing the new pollen trap at its base.
Figure 3:
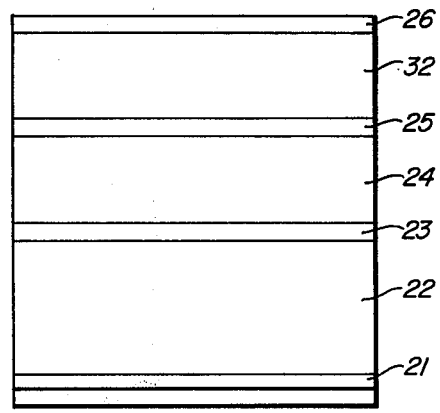
FIG. 3 is a view similar to FIG. 2 showing the novel pollen trap at the top of the beehive.
Figure 4:
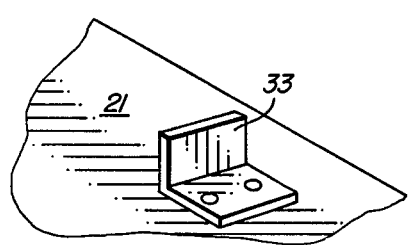
FIG. 4 is a view similar to FIGS. 2 and 3 showing the novel pollen trap in the center of the beehive.

Although the pollen trap 32 is generally mounted on the bottom board 21 and between it and the brood box 22 as shown diagrammatically in FIG. 2, it may also be mounted at the top of the hive as diagrammatically shown in FIG. 3 or in the middle of the hive as diagrammatically shown in FIG. 4 and operate effectively. The parts of the hives including the addition of the pollen trap 32 may be readily interconnected by suitable means such as the pin and socket arrangement shown in FIGS. 5 and 6.

Figure 6:
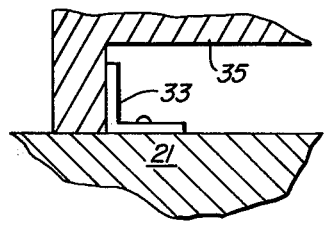
FIG. 6 is a partial side view showing the connection of the bottom board and pollen trap employing the connection means of FIG. 5.
Figure 5:
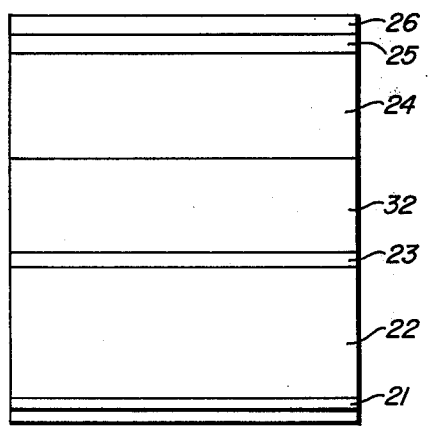
FIG. 5 is a partial perspective view of one means of attaching the bottom board to a pollen trap.

FIGS. 5 and 6 illustrate a clip 33 secured to a part of the bottom board 21 of the hive and clips around a part of the frame of the pollen trap 32. In this manner the base board of the hive may be interconnected with the pollen trap to form a unitary structure if so desired.

Figure 7:
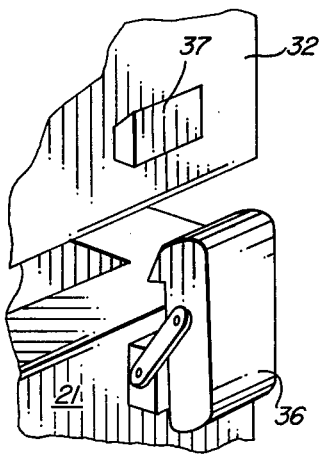
FIG. 7 is a partial perspective exploded view of a catch means for interconnecting two adjacent parts of the beehive.
Figure 8:
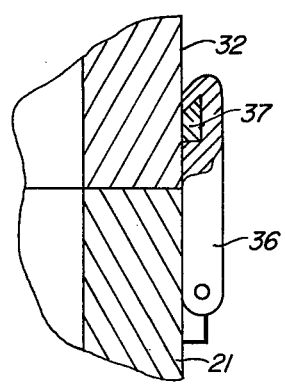
FIG. 8 is a cross-sectional view of the parts shown in FIG. 7 illustrating the catch in engaging position.
Figure 9:
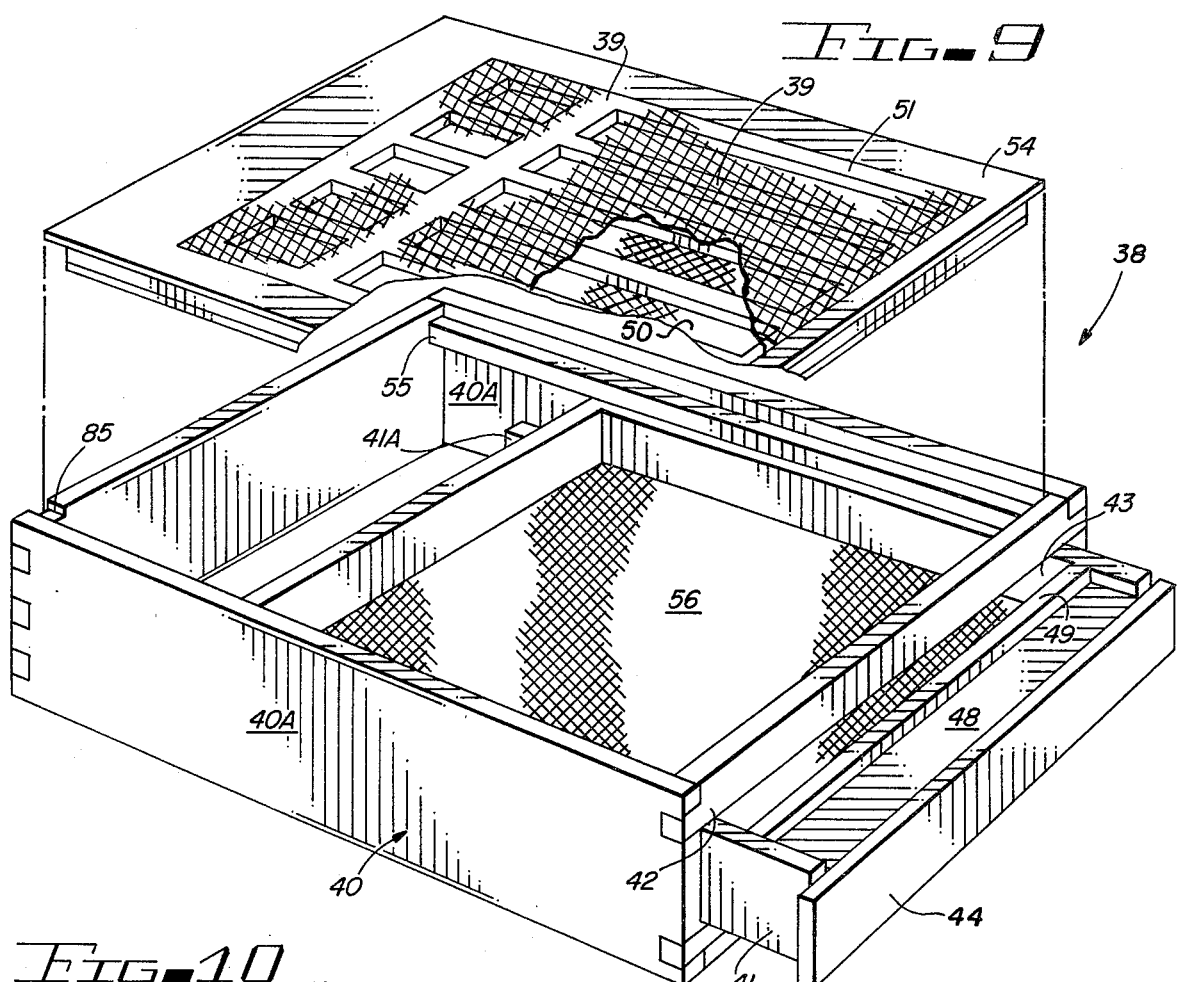
FIG. 9 is an exploded perspective view of a pollen trap embodying the invention.

To hold the parts together a pivotally mounted latch 36 and catch 37 of the well known type may be fastened to the outside surface of two adjacent parts of the hive such as the base board 21 and pollen trap 32 as illustrated in FIGS. 7 and 8.

Figure 10:
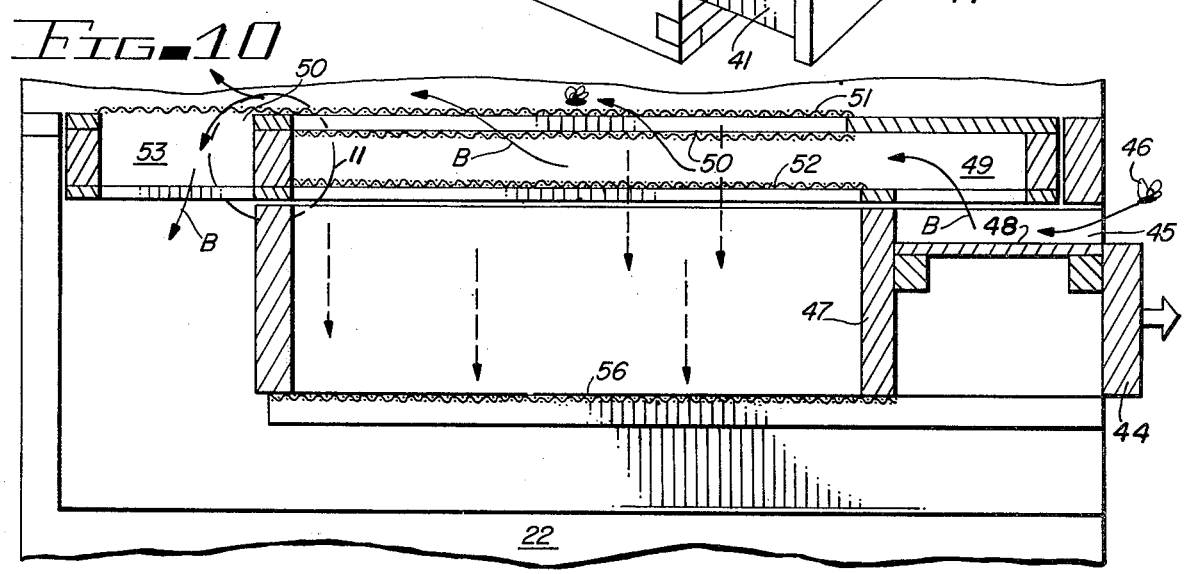
FIG. 10 is a cross-sectional view of the structure of FIG. 9 showing the direction of travel of the bees moving through the trap when used as either a middle or top trap or in a double queen colony.
Figure 11:
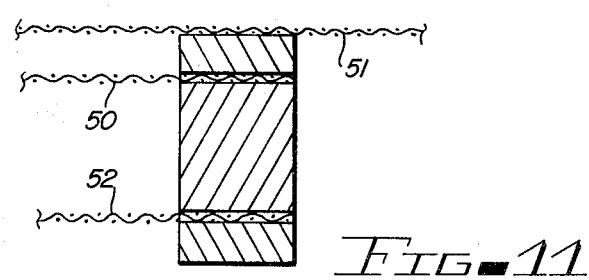
FIG. 11 is an enlargement of the circled area 11 of FIG. 10.
Figure 12:
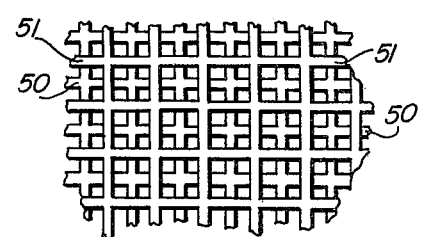
FIG. 12 is a top view of the wire grating in the pollen trap showing the offsetting of the squares of the mesh in the two associated screens of the trap.

FIGS. 9-12 disclose in more detail a pollen trap 38 which may be positioned in any one of the three positions diagrammatically shown in FIGS. 2-4. This embodiment of the pollen trap comprises an open ended rectangular box-like frame 40 having a rectangular shaped drawer 41 slidably mounted on a pair of rails 41A fastened to the sides 40A of frame 40 to extend into frame 40 from end 42 thereof through an opening 43. Opening 43 is larger than the front plate or handle 44 of the drawer thereby providing an entranceway 45 above the plate or handle 44 for the worker bees 46 to enter the pollen trap as shown in FIG. 10.

Drawer 41 is provided with a partition 47 extending laterally across its longitudinal axis near the front of the drawer and together with a shelf 48 forms a part of the entranceway 45 of the pollen trap directing the bees upwardly through a passage 49 extending between a pair of spaced grating or offset screens 50 and 51 of predetermined size mesh and a lower screen 52 and then downwardly through a passageway 53 into brood box 22 as shown by arrows B. Screen 52 comprises a mesh smaller than the size of the worker bees and forms a barrier over the top of drawer 41.

It should be noted that a different diameter of screen is used on the bottom of the pollen drawer to reflect the atmospheric temperatures surrounding the colony. When the humidity is dry and below 30–50%, relatively small mesh screen is used since air circulation is not necessary to dry out the pollen. When the humidity is above 80% a wire mesh of a relatively larger size is used on the bottom of the pollen drawer to permit the maximum circulation of air and heat through the pollen to help remove the moisture and dry the pollen.

It is proposed that a screen having 7 squares to the inch formed from wire of a diameter 0.018 of an inch be used over the pollen drawer to allow the pollen to fall through into the pollen drawer and yet keep the bees out of the pollen drawer. Every other known trap either uses mesh of 8 squares to the inch or 6 squares to the inch over the pollen drawer. The 8 squares to the inch screen is such a small mesh that in the times of pollen flows of large granules they pile up on the corners of the wire and eventually create a solid mass of pollen up through the wire and theoretically could permit the colony to smother. The wire mesh of 6 squares to the inch is large enough so that bees penetrate the wire and enter the pollen drawer, yet the wire is small enough that the bees cannot then escape but are left in the pollen drawer to eat the pollen and eventually die. Neither the 8 or the 6 squares to the inch mesh are correct for the screens over the pollen drawer. Only 7 squares to the inch is ideal and serves and accomplishes both tasks of allowing the pollen to free flow into the pollen drawer regardless of the size of the granules and yet keep all bees out of the pollen drawer.

This trap is unique in that the two layers of a screen having a mesh employing 5 squares to the inch of a 0.023 diameter wire is offset or staggered horizontally both up and across. No other known pollen trap employs a mesh of 5 squares to the inch staggered in both directions. This staggering of the screens cause a 25% greater efficiency in trapping the pollen from the worker bees than heretofore accomplished.

It should be noted that this type of pollen trap must be placed at the top or in the center of a beehive as illustrated diagrammatically in FIGS. 3 and 4 of the drawing.

FIGS. 9 through 12 illustrate that the portion of the pollen trap 32 comprising the mesh screens 50, 51 and 52 are mounted in a detachable sub-frame 54 which rests in frame 40 on a pair of ledges 55, one attached to each of its sides 40A. The sub-frame 54 is provided with lattice straps 39 which serve as ladders for the bees.

As indicated in FIG. 10, the bees enter the hive and the pollen trap through the entranceway 45 and move into and along a passageway 49 between grids or screens 50 and 52. At this point, the bees have to crawl through the opening in the grid or screen 50 and then crawl through the openings in the grid or screen 51 which are offset from the opening in screen 50. The function of the pollen traps is to force the incoming foraging bees with pollen pellets on their hind legs to twist their bodies through the opening in screens 50 and 51. In twisting through the grid formed by these screens, pollen pellets are scraped off of their legs and fall down through screen 52 into the pollen drawer 41 above a screen 56 positioned at the bottom of the drawer.

Figure 13:
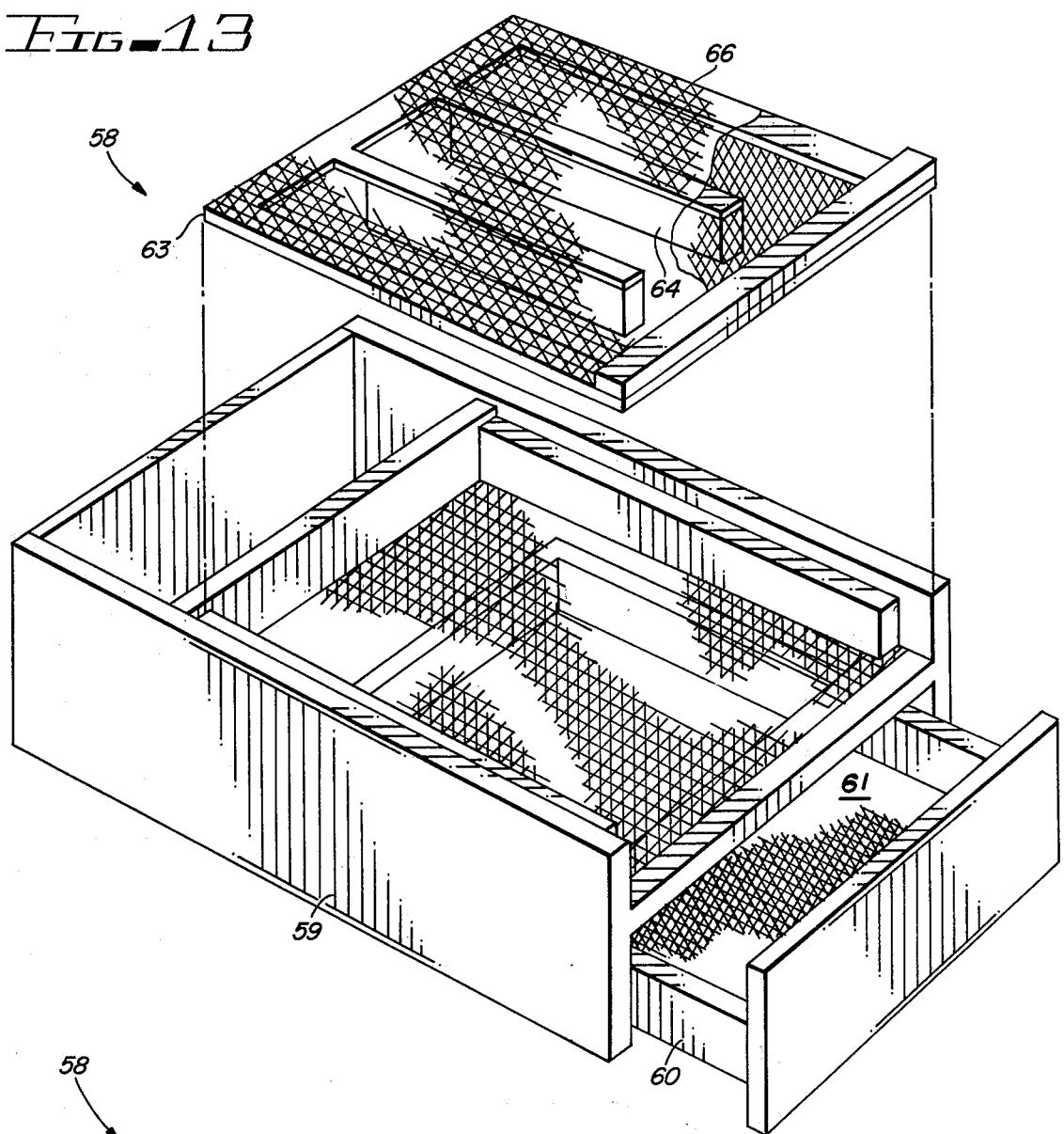
FIG. 13 is an exploded perspective view of a modification of the pollen trap shown in FIG. 9 without queen excluder wire.
Figure 14:
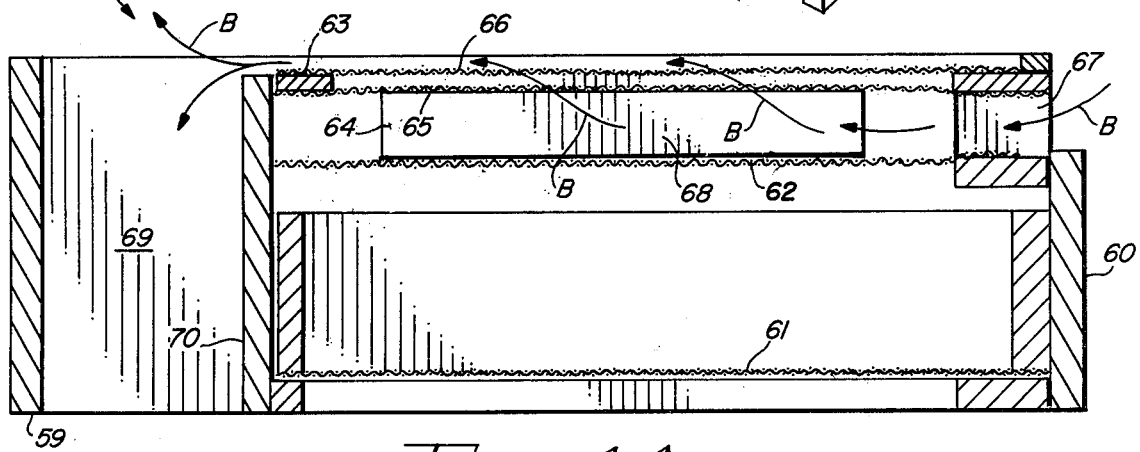
FIG. 14 is a cross-sectional view of the pollen trap shown in FIG. 13 illustrating the path of movement of the bees when used in a middle or top trap configuration.

FIGS. 13 and 14 illustrate a modification of the pollen box shown in FIGS. 1–12 wherein pollen box 58 comprises a frame 59 having a drawer 60 slidably mounted therein. The bottom of the drawer is formed by a fine mesh screen 61. Adjacent the top of the drawer is mounted a second screen 62 having a mesh size small enough to prohibit the worker bees from passing therethrough. A sub-frame 63 comprising a pair of support braces or rails 64 extending longitudinally thereof is covered by a pair of closely spaced offset screens 65 and 66 through which the worker bees pass in the twisting manner disclosed in the description of pollen box 38.

As shown in FIG. 14, the worker bees enter the hive in the direction of arrows B through the entranceway 67 and pass into the passageway 68 extending along the length of drawer 60 between screens 62 and 65. At this point, the bees climb up the rails 64 and wiggle through the offset screens 65 and 66 dropping or rubbing off their legs a good share of the pollen collected by them. This pollen falls through screen 62 and is collected on screen 61 along the full length of the drawer.

After passing through screens 65 and 66, the worker bees pass downwardly through a cluster area 69 formed behind a partition 70 behind drawer 60 in the pollen trap 58. From this area 69, the worker bees may move into the brood box 22 or super 24 depending on how the hive parts are assembled. This pollen trap may be positioned at the top or center of the hive as illustrated in FIGS. 3 and 4.

FIGS. 15 and 16 illustrate a further modification of the pollen traps shown in FIGS. 1–14 wherein pollen trap 71 comprises a drawer 72 slidably mounted in a frame 73 and is used as a bottom trap below the entire beehive. Frame 73 is mounted on the bottom board 21 of a hive and provides an entranceway 74 for the worker bees which is connected to a passageway 75 extending along the length of the pollen box underneath drawer 72 with further passageways 76 and 77 interconnected with passageway 75 arranged at the front of the drawer and behind it in frame 73.

The bottom of drawer 72 is covered with a fine mesh wire 78 and the top of the drawer as well as frame 73 is covered by a frame 79 supported in the top of the frame by suitable supporting ledges (not shown).

Frame 79 is covered by a pair of spacedly arranged offset wire grids or screens 80 and 81 through which the bees wiggle causing them to scrape off their legs the pollen, as heretofore explained, and a bottom grid or screen 82 defining between grids or screens 81 and 82 a passageway 83 along the top of the drawer 72 for the bees to move freely in. It should be noted that frame 79 is reinforced by one or more longitudinally extending rails 84 in the manner of the other pollen traps for the bees to use as ladders as they crawl up to and wiggle through the mesh openings in the grids or screens 80 and 81.

This pollen trap is usually positioned at the bottom of a hive as diagrammatically shown in FIG. 2 causing the worker bees to move across the bottom of the drawer from either the front or back of the pollen trap when the bees enter the pollen trap, thereby eliminating most of the entranceway pile up and clustering of the worker bees in front of the hive. As evident from FIGS. 9 and 16, an exit way 85 is provided for the drone bees and the queen bee if she chooses in the back of frames 40 and 73 since these bees are too large to enter and exit through the double five squares to the inch wire meshes 50 and 51 used by the worker bees.

FIGS. 17 and 18 illustrate a still further modification of the pollen traps shown in FIGS. 1-16 wherein pollen trap 86 comprises a frame 87 in which is slidably mounted a drawer 88 the top of which is always covered with a screen the wire mesh of which is small enough to prohibit the worker bees from crawling into the drawer. Above the drawer 88 in frame 87 is mounted a pair of offset screens 89 and 90 the mesh of which is large enough to permit the worker bees to wiggle therethrough. In this embodiment the drawer extends the full length of the frame. This pollen trap is used on the bottom of a hive as shown in FIG. 2.

Two exits 91 and 92 are shown as being provided above the entranceway 93 for the worker bees or preferably to the rear of the pollen trap and are used by the drones and queen bee as heretofore explained.

An improved pollen trap for beehives is thus disclosed in accordance with the stated objects of the invention, and although but a few embodiments of the invention have been illustrated and described, it will be apparent to those skilled in the art that various changes and modifications may be made therein without departing from the spirit of the invention or from the scope of the appended claims.

What is claimed is:

1. A pollen trap for collecting pollen from bees as they enter a vertically arranged beehive comprising:
   a frame having an open top and dimensioned to fit as one of the axially positioned parts of a vertically stacked beehive,
   a drawer slidably arranged in said frame to assume a substantially horizontal position in the hive,
   said drawer having a bottom surface comprising a first screen, the mesh size of which is smaller than the pollen dropped thereon by the bees,
   a second screen mounted in said frame above said drawer and having a mesh size smaller than the size of the pollen carrying bees for prohibiting them from entering the drawer,
   a pair of parallelly and spacedly arranged third and fourth screens mounted in a sub-frame on said frame, but offset above said second screen and forming a space between said second screen and said pair of screens,
   said third and fourth screens having mesh openings offset from each other causing bees crawling through said pair of screens to be forced to follow a circuitous path divesting their legs of a substantial portion of the pollen carried thereon,
   said sub-frame having at least one rail mounted longitudinally of said drawer juxtapositioned to the lowermost screen of said pair of screens downstream of the direction of movement of the bees and forming a ladder for the bees to use in reaching said pair of screens, and
   an entranceway for the pollen carrying bees into the pollen trap positioned adjacent the front of said drawer and connected with said space between said second screen and said pair of screens,
   whereby the bees may move through said pair of screens at a plurality of points along their lengths.

2. The pollen trap set forth in claim 1 wherein:
said frame defines a cluster area behind said drawer for the pollen collecting bees.

3. The pollen trap set forth in claim 1 wherein:
said entranceway is positioned immediately above said drawer.

4. The pollen trap set forth in claim 1 wherein:
said entranceway is positioned immediately below said drawer.

5. The pollen trap set forth in claim 1 wherein:
said entranceway is positioned immediately below said drawer, and
the bees move into a space in said frame below said drawer, moving into the space between said second screen and said pair of screens from both ends of said drawer.

6. The pollen trap set forth in claim 1 wherein:
said second screen comprises a mesh having seven square openings per inch, and
said third and fourth screens comprising a mesh having five square openings per square inch.

* * * * *